United States Patent [19]
Harvey

[11] 3,883,567
[45] May 13, 1975

[54] ANTHRAQUINONE DYESTUFFS
[75] Inventor: Edwin Dennis Harvey, Manchester, England
[73] Assignee: Imperial Chemical Industries Limited, London, England
[22] Filed: May 25, 1970
[21] Appl. No.: 40,374

[30] Foreign Application Priority Data
June 17, 1969 United Kingdom............... 30618/69

[52] U.S. Cl. ................ 260/379; 260/380; 8/34, 8/40
[51] Int. Cl............................................. C09b 1/50
[58] Field of Search ............ 8/25, 39; 260/380, 379

[56] References Cited
UNITED STATES PATENTS
2,727,045  12/1955  McSheehy .......................... 260/378

FOREIGN PATENTS OR APPLICATIONS
205,881   1903   Germany ........................... 260/380
1,026,825  4/1966  United Kingdom ................. 260/380

Primary Examiner—Robert Gerstl
Attorney, Agent, or Firm—Cushman, Darby & Cushman

[57] ABSTRACT
Water-insoluble anthraquinone dyestuffs of the formula

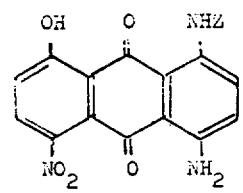

and mixtures of such dyestuffs with dyestuffs of the formula:

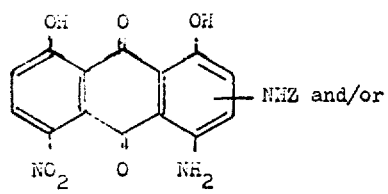

NHZ and/or 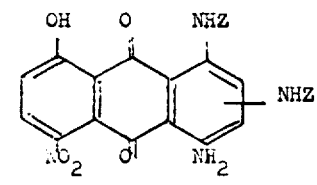 NHZ wherein Z is hydrogen or optionally substituted alkyl or phenyl; and a process for producing such dyes by reacting 1:8-dihydroxy-4-amino-5-nitroanthraquinone with an amine of the formula $ZNH_2$ in the presence of boric acid or a derivative thereof; and the use of such dyestuffs or mixture thereof for colouring synthetic textile materials.

6 Claims, No Drawings

ANTHRAQUINONE DYESTUFFS

This invention relates to anthraquinone dyestuffs and more particularly to disperse anthraquinone dyestuffs and mixtures thereof which are valuable for colouring synthetic textile materials.

According to the invention there are provided the disperse anthraquinone dyestuffs, free from acidic water-solubilising groups, which are of the formula:

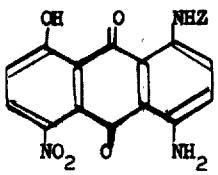

Formula I wherein Z is a hydrogen atom or an optionally substituted aliphatic or aryl radical; and also mixture of such dyestuffs with dyestuffs of the formulae:

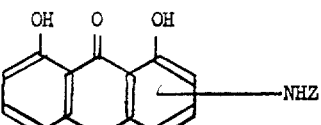

Formula II and/or

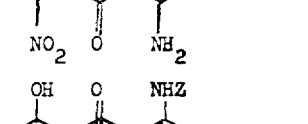

Formula III

The optionally substituted aliphatic radicals represented by Z are preferably optionally substituted alkyl radicals in particular alkyl radicals containing from 1 to 8 carbon atoms and above all lower alkyl radicals, or cycloalkyl radicals, and the optionally substituted aryl radicals represented by Z are preferably optionally substituted phenyl radicals, As specific examples of such radicals there may be mentioned lower alkyl such as methyl, ethyl, n-propyl, iso-propyl, n-butyl, isobutyl, sec-butyl and tertiary butyl, and also n-hexyl, n-pentyl and 1:5-dimethyl-n-hexyl, hydroxy lower alkyl such as β-hydroxyethyl, β:γ-dihydroxypropyl, β- and γ-hydroxy-n-propyl and γ-hydroxy-n-butyl, lower alkoxy lower alkyl such as β-(methoxy or ethoxy)ethyl and γ-(methoxy, ethoxy or propoxy)propyl, lower alkyl carbonyloxy lower alkyl such as acetoxyethyl, cyano lower alkyl such as β-cyanoethyl, carbo lower alkoxy lower alkyl such as β-carboethoxyethyl, and phenyl lower alkyl such as benzyl and β-phenylethyl; cycloalkyl such as cyclohexyl and substituted cycloalkyl such as 2-(methyl or benzyl) cyclohexyl and lower alkoxy cycloalkyl such as α-, β- or γ-(methoxy or ethoxy)cyclohexyl; and substituted phenyl such as chlorophenyl, bromophenyl, tolyl, hydroxyphenyl, aminophenyl, acetylaminophenyl, acetoxyphenyl, lower alkoxy phenyl such as methoxyphenyl and ethoxyphenyl, lower alkylphenyl such as tolyl, hydroxy lower alkyl phenyl such as β-hydroxyethylphenyl, hydroxylower alkoxy phenyl such as β-hydroxyethoxyphenyl, N-lower alkylaminophenyl, and N:N-di(lower alkyl)aminophenyl.

Throughout this Specification the terms lower alkyl and lower alkoxy are used to denote alkyl and alkoxy radicals respectively containing from 1 to 4 carbon atoms.

According to a further feature of the invention there is provided a process for the manufacture of the anthraquinone dyestuffs and mixtures thereof of the invention which comprises reacting 1:8-dihydroxy-4-amino-5-nitroanthraquinone with ammonia or a primary aliphatic or aromatic amine which is free from acidic water-solubilising groups in the presence of boric acid or its anhydride or a derivative thereof, and optionally in the presence of an organic solvent.

The process of the invention can be conveniently carried out by stirring the 1:8-dihydroxy-4-amino-5-nitroanthraquinone, the primary amine and the boric acid together, preferably at a temperature between 50°C. and the boiling point of the reaction mixture, and for a time which is normally in the region of from 15 minutes to 30 hours. The course of the reaction can, if desired, be followed by withdrawing samples of the reaction mixture and subjecting them to thin layer chromatography, the reaction being terminated when the required product or mixture of products has been obtained. The resulting dyestuff or mixture thereof, can then be isolated by conventional methods, for example by adding an organic liquid, such as methanol or ethanol, in which the dyestuff is insoluble and filtering off the precipitated dyestuff.

When using ammonia in the process, then it is preferred to pass a stream of ammonia through a solution of the 1:8-dihydroxy-4-amino-5-nitroanthraquinone in an organic solvent which also contains the boric acid.

In carrying out the reaction it is preferred to use at least one mole of the ammonia or primary amine, and, above all, between one and three mols. of the ammonia or primary amine for each mol of the 1:8-dihydroxy-4-amino-5-nitroanthraquinone. In order that the reaction mixture is sufficiently fluid, it is usually found necessary to additionally use an organic solvent. If desired this can be an excess of the primary amine, in which case it is found that the resulting product comprises a mixture of the anthraquinone dyestuffs of Formulae I, II and III in which there is usually at least 50% of the dyestuff of Formula I.

It is however preferred to use a phenolic compound, such as phenol or o-cresol, as the organic solvent for the reaction in which case the resulting product comprises a pure dyestuff of Formula I or a mixture of the dyestuffs of Formula I and III in which the dyestuff of Formula I predominates. Whilst between 1 part and 20 parts of the phenolic compound can be used for each part of the 1:8-dihydroxy-4-amino-5-nitroanthraquinone it is preferred to use between 3 and 10 parts of the phenolic compound. It is found that the dyestuff of Formula III is formed as the result of overcondensation arising from one or more of the following factors :- increased reaction temperature and/or time, increased usage of boric acid, increased usage of primary amine, reduction in the usage of phenolic compound, or use of a water-binding agent such as butyl borate.

In carrying out the process it is found that primary aliphatic amines react more readily than primary aromatic amines, so that while temperatures in the region of 50° to 100°C. are in general suitable for the reaction of the 1:8-dihydroxy-4-amino-5-nitroanthraquinone with primary aliphatic amines, temperatures above 100°C., preferably between 120° and 160°C., are generally required when using primary aromatic amines in the reaction.

As examples of derivatives of boric acid which can be used in the process there may be mentioned compounds of the formula (VO)₃B wherein V is an alkyl or aryl radical; and as specific examples of such compounds there may be mentioned tri-n-propyl borate, tri-n-butyl borate, tri-sec-butylborate, tri-n-amyl borate, tri-n-hexyl borate, tri-phenylborate, tri-p-methylphenyl borate and tri-p-chlorophenyl borate. It is preferred to use between one and three mols of the boric acid or derivative thereof for each mol of the 1:8-dihydroxy-4-amino-5-nitroanthraquinone.

As specific examples of primary amines which can be used in the process there may be mentioned methylamine, ethylamine, n-propylamine, isopropylamine, n-butylamine, iso-butylamine, sec-butylamine, tertiarybutylamine, 1:5-dimethyl-n-hexylamine, n-hexylamine, n-heptylamine, n-pentylamine, β-hydroxyethylamine, β- or γ-hydroxy-n-propylamine, β-(methoxy or ethoxy) ethylamine, γ-(methoxy, ethoxy or n-propoxy)propylamine, β-methoxyisopropylamine, benzylamine, β-phenylethylamine, cyclohexylamine, 2-benzylcyclohexylamine, aniline, o-, m-, or p-toluidine, o-, m- or p- (chloro- or bromo-) aniline, o-, m- or p- (hydroxy, amino, methoxy or ethoxy) aniline (anisidines or phenetidines), 4-(β-hydroxyethyl) aniline, 4-(β-hydroxyethoxy)aniline, 2:4:6-trimethylaniline, 2:6-diethylaniline, p-acetylaminoaniline and p-amino-N-methylacetanilide.

The anthraquinone dyestuffs and mixtures thereof of the invention are valuable for colouring synthetic textile materials, cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn or woven or knitted fabric.

Such textile materials can conveniently be coloured with the said anthraquinone dyestuffs, by immersing the textile material in a dyebath comprising an aqueous dispersion of one or more of the said dyestuffs, which dyebath preferably contains non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85°C.; in the case of cellulose triacetate or polyamide textile materials it is preferred to carry out the dyeing process at 95° to 100°C.; in the case of aromatic polyester textile materials the dyeing process can either be carried out at a temperature between 90° and 100°C. preferably in the presence of a carrier such as diphenyl or o-hydroxydiphenyl, or at a temperature above 100°C., preferably at a temperature between 120° and 130°C., under superatmospheric pressure.

Alternatively the aqueous dispersion of the said anthraquinone dyestuffs can be applied to the textile material by a padding or printing process, followed by heating or steaming of the textile material. In such processes it is preferred to incorporate a thickening agent, such as gum tragacanth, gum arabic, or sodium alginate, into the aqueous dispersion of the said anthraquinone dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The anthraquinone dyestuffs and mixtures thereof of the invention can also be applied by solvent dyeing methods or used for the mass colouration of synthetic polymers which are subsequently converted into the form of textile materials.

The anthraquinone dyestuffs have excellent affinity and building up properties on synthetic textile materials, and in particular on aromatic polyester textile materials, so enabling heavy depths of shade to be obtained. The resulting colourations have excellent fastness to light, to wet treatments, and, in particular, to dry heat treatments such as those carried out at high temperatures during pleating operations.

The anthraquinone dyestuffs are also valuable for colouring cellulose acetate textile materials as the resulting colourations have excellent fastness to gas fumes.

A preferred class of the anthraquinone dyestuffs and mixtures thereof of the invention comprises the dyestuffs wherein —NHZ represents the group

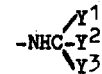

wherein $Y^1$ is a hydrogen atom or an optionally substituted alkyl radical, and $Y^2$ and $Y^3$ each independently represent an optionally substituted alkyl radical or when $Y^1$ is hydrogen, $Y^2$ and $Y^3$ form with the carbon atom C a six membered carbocyclic ring, since the colourations obtained from such dyestuffs do not fade off tone when exposed to light.

If desired the anthraquinone dyestuffs of the invention can be applied to synthetic textile materials in conjunction with other disperse dyes, such as are described in, for example, British Specifications Nos. 806271, 835819, 840903, 847175, 852396, 852493, 859899, 865328, 872204, 894012, 908656, 909843, 910306, 913856, 919424, 944513, 944722, 953887, 959816, 960235 and 961412.

The invention is illustrated but not limited by the following Examples in which the parts and percentages are by weight :

EXAMPLE 1

A mixture of 5 parts of 1:8-dihydroxy-4-amino-5-nitro anthraquinone and 50 parts of phenol is stirred for 15 minutes at 135°C. 9 Parts of aniline are added, the mixture is stirred for a further 15 minutes at 135°C., 1.3 parts of boric acid are then added and stirring continued for a further 100 minutes at 135°C. The mixture is then cooled to 50°C., 150 parts of methanol are added over 1 hour, and the mixture then stirred for 24 hours at 20°C. The precipitated dyestuff is then filtered off, washed with methanol and dried. The yield of dyestuff is 3.8 parts.

Analysis and chromatography indicates that the dyestuff consists essentially of the compound of the formula:

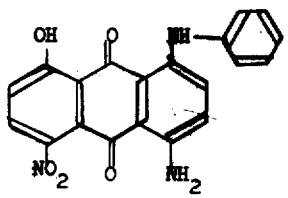

When applied to polyester textile materials from an aqueous dispersion the dyestuff yields bright greenish-blue shades of excellent fastness to light and to dry heat treatments.

EXAMPLE 2.

A mixture of 5 parts of 1:8-dihydroxy-4-amino-5-nitro anthraquinone and 25 parts of phenol is stirred at 60°C. and 10 parts of aniline are added. The temperature of the mixture is raised to 130°C., 2.6 parts of boric acid are then added and the mixture is stirred for 2½ hours at 130°C. The mixture is then cooled to 60°C., 25 parts of methanol and 2.5 parts of water are added, the mixture is cooled to 25°C., and the precipitated dyestuff is filtered off washed with methanol and dried. The yield is 4.2 parts.

Analysis and chromatography indicates that the dyestuff consists essentially of from 85 to 90% of the dyestuff of Example 1 together with from 10 to 15 % of the compound of the formula:

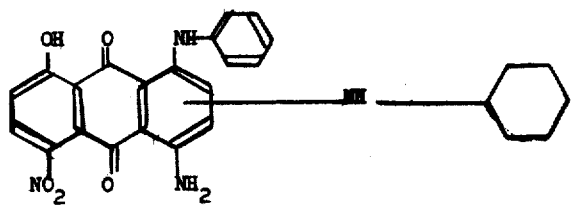

The dyestuff of this Example when applied to polyester textile materials gives somewhat greener shades then the dyestuff of Example 1 and has superior build-up properties.

Example 3

A mixture of 5 parts of 1:8-dihydroxy-4-amino-5-nitroanthraquinone, 30 parts of aniline and 2 parts of boric acid is stirred for 20 hours at 120°C. The mixture is cooled to 50°C., poured into 150 parts of ethanol, the mixture cooled to 20°C. and the precipitated dyestuff filtered off, washed with a 50% aqueous solution of ethanol and dried. The yield is 5.8 parts.

Analysis and chromatography indicates that the dyestuff of this Example consists of a mixture of approximately 55% of the dyestuff of Example 1, of approximately 15% of the second component of the dyestuff of Example 2, and approximately 30% of the compound of the formula:

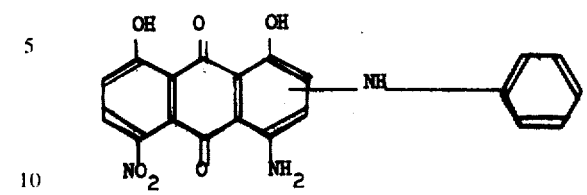

When applied to polyester textile materials the dyestuff mixture of this Example gives much redder shades than are obtained using the dyestuff of Examples 1 or 2. The dyestuff mixture of this Example has also excellent affinity for cellulose acetate textile materials and the resulting colourations have excellent gas-fume fastness.

EXAMPLE 4

A mixture of 5 parts of 1:8-dihydroxy-4-amino-5-nitroanthraquinone and 50 parts of phenol is stirred at 120°C. and 9 parts of aniline are added followed by the addition of 11.5 parts of butyl borate over 5 minutes. The mixture is then stirred for 2 hours at 120°C., cooled to 60°C., and diluted with 150 parts of a methanol/water mixture (9:1). The mixture is cooled to 20°C., and the precipitated dyestuff is filtered off, washed with methanol and dried.

The resulting dyestuff is identical with the dyestuff of Example 1.

The following Table gives further Examples of anthraquinone dyestuffs which are obtained by reacting 1:8-dihydroxy-4-amino-5-nitroanthraquinone with the amines listed in the second column of the Table using the process outlined in Example 1, except that the reaction is carried out for the time and at the temperature specified in the third column of the Table instead of for 100 minutes at 135°C. The resulting dyestuffs are essentially single compounds of the formula:

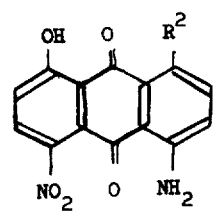

where $R^2$ has the value specified in the fourth column of the Table. The fifth column of the Table gives the sahdes obtained when the dyestuffs are applied to polyester textile materials.

| Ex. | Amine | Reaction Conditions | $R^2$ | Shade |
|---|---|---|---|---|
| 5 | o-toluidine | 3 hours at 135°C. | o-methylanilino | Greenish-blue |
| 6 | m-toluidine | 2 hours at 135°C. | m-methylanilino | do. |
| 7 | p-toluidine | 1 hour at 140°C. | p-methylanilino | do. |
| 8 | p-ethylaniline | do. | p-ethylanilino | do. |
| 9 | p-isopropyl-aniline | do. | p-isopropylanilino | do. |
| 10 | p-tertiarybutyl-aniline | do. | p-tertiarybutylanilino | do. |
| 11 | o-anisidine | 1¼ hours at 135°C. | o-methoxyanilino | Bluish-green |
| 12 | m-anisidine | 2½ hours at 130°C. | m-methoxyanilino | Greenish-blue |
| 13 | p-anisidine | 1¼ hours at 135°C. | p-methoxyanilino | Bluish-green |

Table—Continued

| Ex. | Amine | Reaction Conditions | R² | Shade |
|---|---|---|---|---|
| 14 | o-ethoxyaniline | 20 hours at 120°C. | o-ethoxyanilino | do. |
| 15 | p-ethoxyaniline | 1¼ hours at 135°C. | p-ethoxyanilino | do. |
| 16 | p-(β-hydroxyethoxy)aniline | 2½ hours at 135°C. | p-(β-hydroxyethoxy)anilino | do. |
| 17 | p-(β-hydroxyethyl)aniline | 6 hours at 140°C. | p-(β-hydroxyethyl)anilino | Greenish-blue |
| 18 | o-chloroaniline | 30 hours at 130°C. | o-chloroanilino | do. |
| 19 | m-chloroaniline | 18 hours at 130°C. | m-chloroanilino | do. |
| 20 | p-chloroaniline | 2 hours at 140°C. | p-chloroanilino | do. |
| 21 | p-bromoaniline | do. | p-bromoanilino | do. |
| 22 | m-bromoaniline | 20 hours at 130°C. | m-bromoanilino | do. |
| 23 | isopropylamine | 8 hours at 80°C. | isopropylamino | do. |
| 24 | γ-methoxypropylamine | 3 hours at 80°C. | γ-methoxypropylamino | do. |
| 25 | γ-propoxypropylamine | 4 hours at 90°C. | γ-propoxypropylamino | do. |
| 26 | benzylamine | ¼ hour at 120°C. | benzylamino | do. |
| 27 | n-pentylamine | 1 hour at 60°C. | n-pentylamino | do. |
| 28 | 1:5-dimethyl-n-hexylamine | 2 hours at 60°C. | 1:5-dimethyl-n-hexylamino | do. |
| 29 | 1:3-dimethyl-n-butylamine | do. | 1:3-dimethyl-n-butylamino | do. |
| 30 | n-hexylamine | 1 hour at 60°C. | n-hexylamino | do. |
| 31 | n-heptylamine | do. | n-heptylamino | do. |
| 32 | 1-methyl-n-amylamine | do. | 1-methyl-n-amylamino | do. |

EXAMPLE 33

A mixture of 5 parts of 1:8-dihydroxy-4-amino-5-nitroanthraquinone and 25 parts of phenol is stirred at 80°C., 5 parts of cyclohexylamine are added followed by 9 parts of butylborate added over 5 minutes, and the mixture is then stirred for 30 minutes at 80°C. The mixture is cooled, 100 parts of methanol are added, and the precipitated dyestuff is filtered off, washed with methanol and dried. The yield is 3.8 parts.

The resulting dyestuff consists essentially of 1-cyclohexylamino 4-amino-5-nitro-8-hydroxyanthraquinone.

When applied to polyester textile materials from an aqueous dispersion the dyestuff yields greenish-blue shades of excellent fastness properties.

The following Table gives further examples of the anthraquinone dyestuffs which are obtained by replacing the 9 parts of aniline used in Example 4 by equivalent amounts of the amines listed in the second column of the Table, the reaction being carried out for the time and at the temperature specified in the third column of the Table. The fourth column of the Table gives the value of R² while the fifth column of the Table indicates the shades obtained on polyester textile materials.

| Example | Amine | Reaction Conditions | R² | Shade |
|---|---|---|---|---|
| 34 | cyclohexylamine | 1 hour at 60°C. | cyclohexylamino | Greenish-blue |
| 35 | n-butylamine | do. | n-butylamino | do. |
| 36 | β-benzylisopropylamine | 1 hour at 70°C. | β-benzylisopropylamino | do. |
| 37 | 2-benzycyclohexylamine | 1 hour at 65°C. | 2-benzycyclohexylamino | do. |
| 38 | iso-butylamine | ¼ hour at 80°C. | iso-butylamine | do. |
| 39 | β-methoxyisopropylamine | 1 hour at 60°C. | β-methoxyisopropylamino | do. |

EXAMPLE 40

A mixture of 5 parts of 1:8-dihydroxy-4-amino-5-nitroanthraquinone and 25 parts of phenol is stirred at 80°C., 20 parts of tri-n-butyl borate are added, and the mixture stirred for 1 hour at 80°C. A stream of dry ammonia is then passed for 1 hour through the mixture whilst it is maintained at 80°C. The mixture is then cooled to 60°C., 10 parts of water and 50 parts of methanol are added, the mixture cooled to 20°C, and the precipitated dyestuff then filtered off, washed with methanol and dried. The yield of dyestuff is 3.0 parts.

The dyestuff consists essentially of 1:4-diamino-5-nitro-8-hydroxyanthraquinone.

EXAMPLE 41

A mixture of 2.93 parts of boric acid and 60 parts of phenol is stirred for 3 hours at 140°C. and the water formed is distilled off from the reaction medium. The mixture is then cooled to 100°C., 12 parts of 4-amino-5-nitro-1:8-dihydroxyanthraquinone are added followed by the addition of 5.8 parts of 2-aminobutane over 15 minutes The mixture is stirred for 1 hour at 115°C., and is then cooled to 30°C. 60 parts of methanol and 40 parts of water are added, and the precipitated solid is filtered off, washed with water and dried.

The product consists essentially of 1-sec-butylamino-4-amino-5-nitro-8-hydroxyanthraquinone.

EXAMPLE 42.

A mixture of 2.93 parts of boric acid and 60 parts of phenol is stirred for 3 hours at 140°C. and the water formed is distilled off from the reaction medium. The mixture is then cooled to 100°C., 12 parts of 4-amino-5-nitro-1:8-dihydroxyanthraquinone are added added followed by a mixture of 1.26 parts of o-toluidine and 1.26 parts of p-toluidine. The mixture is stirred for 3 hours at 130°C. and is then cooled to 30°C. 30 parts of methanol are added followed by a solution of 27 parts of sodium hydroxide in 40 parts of water, and the precipitated solid is filtered off, washed with water, then with methanol, and is finally dried.

The resulting product consists essentially of a mixture of 1-(o-toluidino)-4-amino-5-nitro-8-hydroxyanthraquinone and 1-(p-toluidino)-4-amino-5-nitro-8-hydroxyanthraquinone.

When dispersed in aqueous medium the dyestuff of this Example dyes polyester textile materials in blue shades of excellent fastness properties.

What I claim is:

1. Water-insoluble anthraquinone dyestuff having the formula

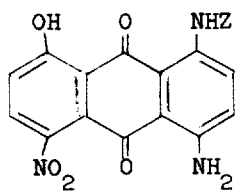

wherein Z is selected from the group consisting of lower alkoxy lower alkyl, cyclohexyl, benzylcyclohexyl, phenyl lower alkyl, phenyl, lower alkylphenyl, lower alkoxy phenyl, chlorophenyl, bromophenyl, hydroxy lower alkoxy phenyl and hydroxy lower alkylphenyl.

2. A process for producing a water-insoluble anthraquinone dyestuff having the formula

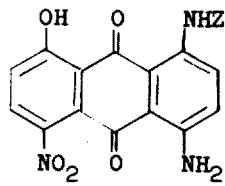

wherein Z is selected from the group consisting of hydrogen, alkyl containing 1-8 carbon atoms, lower alkoxy lower alkyl, cyclohexyl, benzylcyclohexyl, phenyl lower alkyl, phenyl, lower alkylphenyl, hydroxy lower alkoxyphenyl and hydroxy lower alkylphenyl, comprising reacting 1:8-dihydroxy-4-amino-5-nitroanthraquinone with an amine having the formula $ZNH_2$ wherein Z has the meaning given above, the molar ratio of said amine to said anthraquinone ranging between 1–3:1, in the presence of a boron-containing member selected from the group consisting of boric acid, boric anhydride and a compound having the formula $(VO)_3B$ wherein V is selected from the group consisting of alkyl and phenyl, the molar ratio of said boron-containing member to said anthraquinone ranging between 1–3:1, and in the presence of a phenolic compound selected from the group consisting of phenol and o-cresol present in amounts of 1–20 parts per part of said anthraquinone, at a temperature between 50°C and the boiling point of the reaction medium.

3. A process for producing a water-insoluble anthraquinone dyestuff having the formula

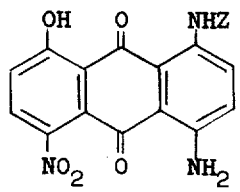

wherein Z is selected from the group consisting of hydrogen, alkyl containing 1-8 carbon atoms, lower alkoxy lower alkyl, cyclohexyl, benzylcyclohexyl, phenyl lower alkyl, phenyl, lower alkylphenyl, lower alkoxyphenyl, chlorophenyl, bromophenyl, hydroxy lower alkoxy phenyl and hydroxy lower alkylphenyl, comprising reacting 1:8-dihydroxy-4-amino-5-nitroanthraquinone with an amine having the formula $ZNH_2$ wherein Z has the meaning given above, in the presence of a boron-containing member selected from the group consisting of boric acid, boric anhydride and a compound having the formula $(VO)_3B$ wherein V is selected from the group consisting of alkyl and phenyl and in the presence of a phenolic compound as a solvent for the reaction, at a temperature between 50°C and the boiling point of the reaction medium.

4. The process of claim 3 wherein the mol ratio of amine to anthraquinone is 1–3:1.

5. The process of claim 3 wherein the phenolic compound is selected from the group consisting of phenol and o-cresol and the phenolic compound is present in amounts of 1–20 parts per part of said anthraquinone.

6. The process of claim 3 wherein said boron-containing member is present in amounts of 1–3 mols per mol of said anthraquinone.

* * * * *